Figure 3:
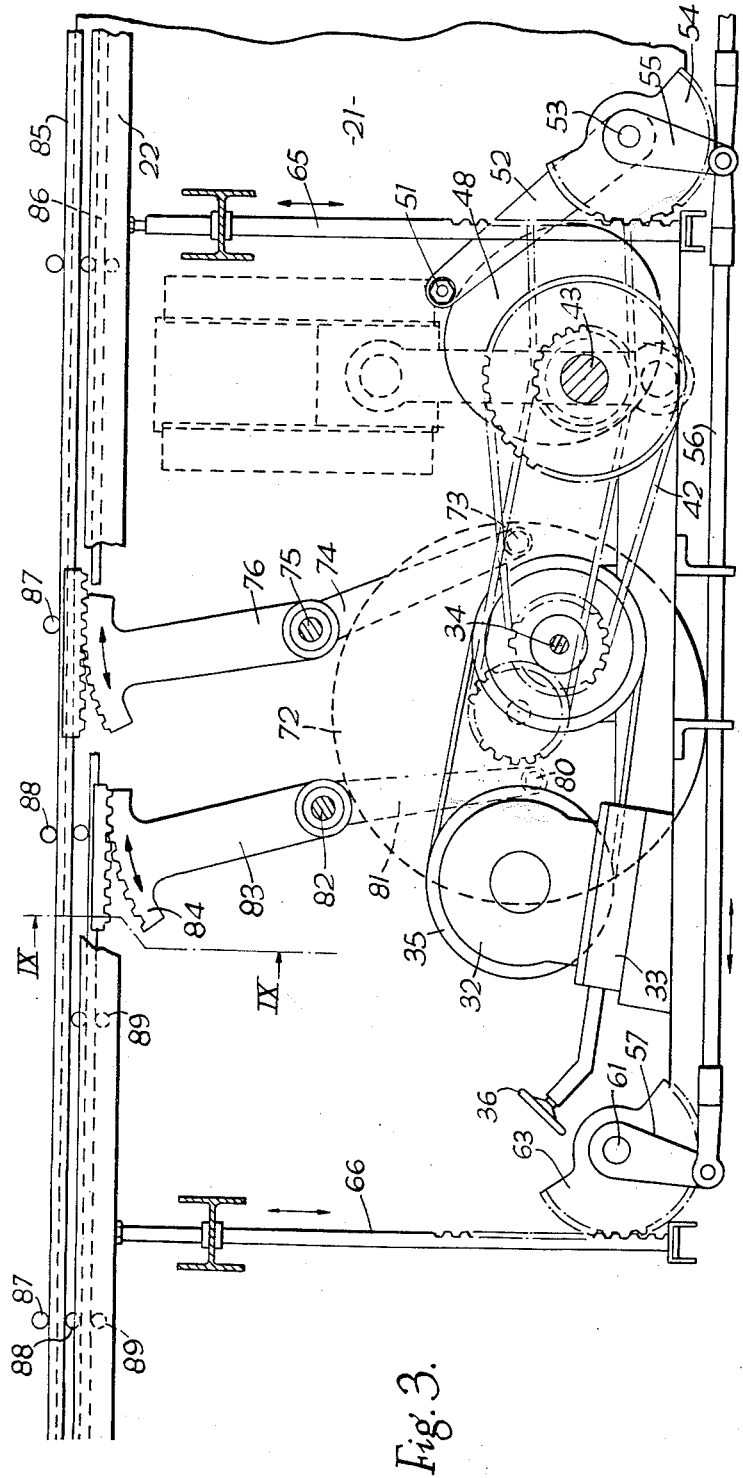

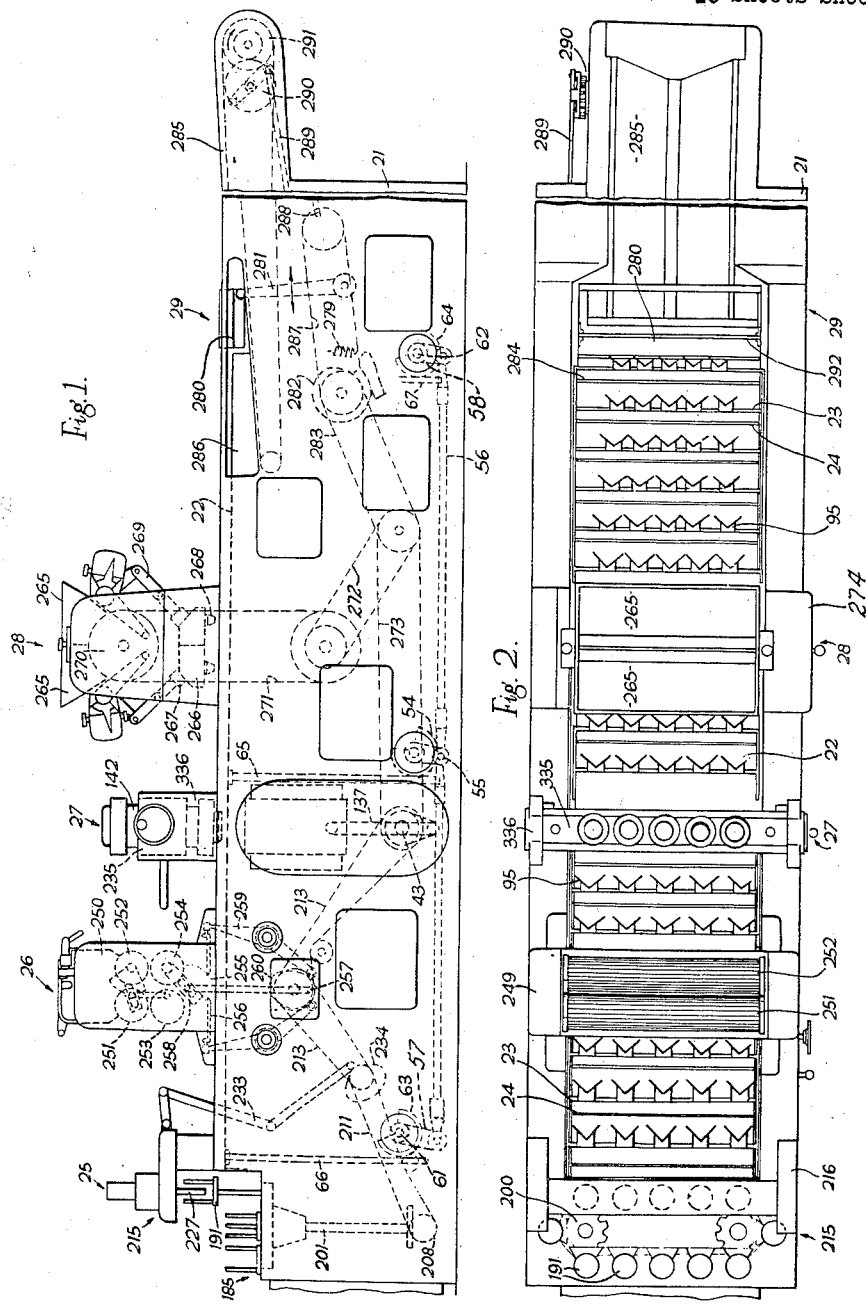

Jan. 1, 1963  K. KREISKY ETAL  3,071,087
DOUGH STAMPING MACHINE
Filed Sept. 9, 1959  15 Sheets-Sheet 6

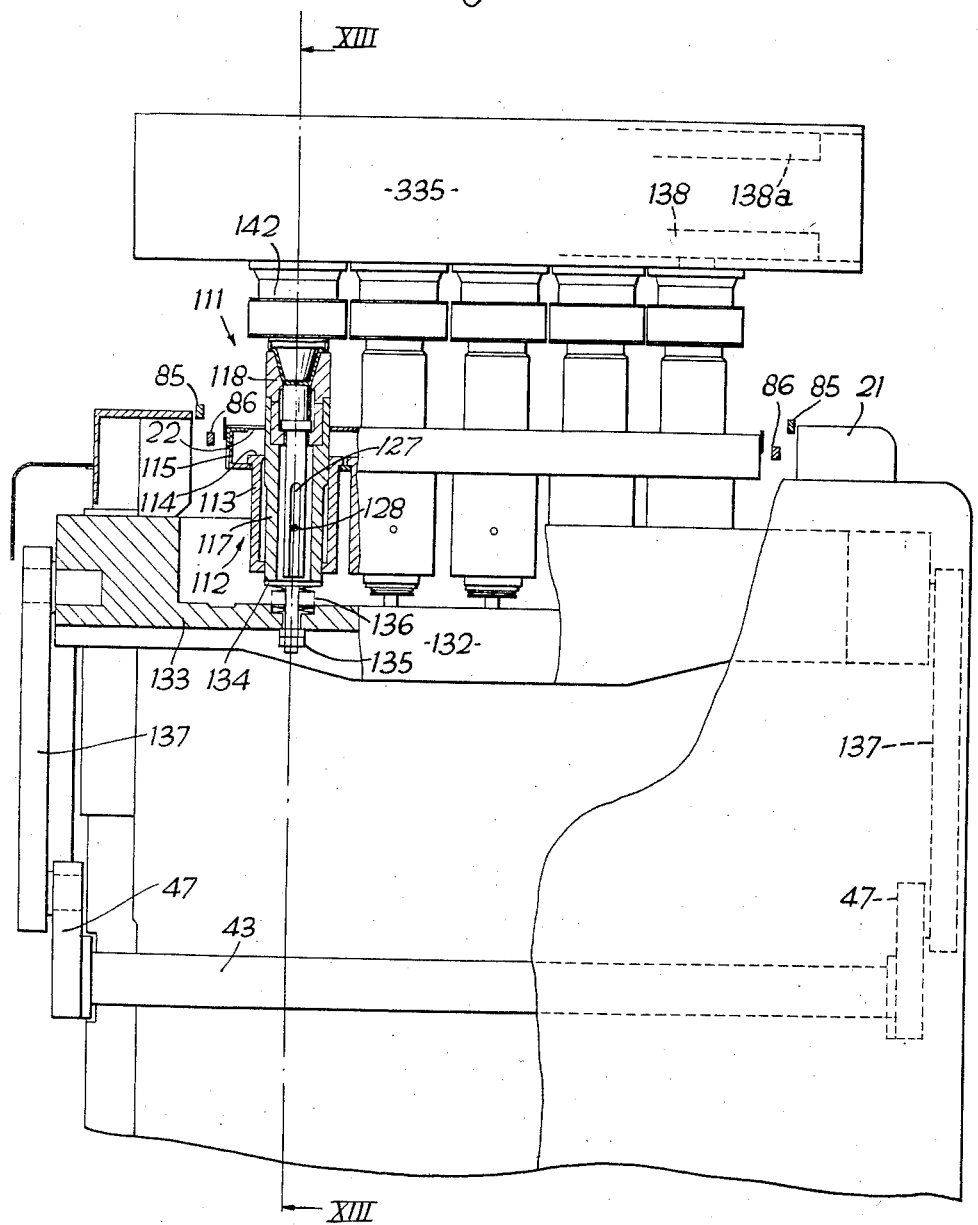

Jan. 1, 1963
K. KREISKY ET AL
3,071,087
DOUGH STAMPING MACHINE
Filed Sept. 9, 1959
15 Sheets-Sheet 9
Fig. 14.
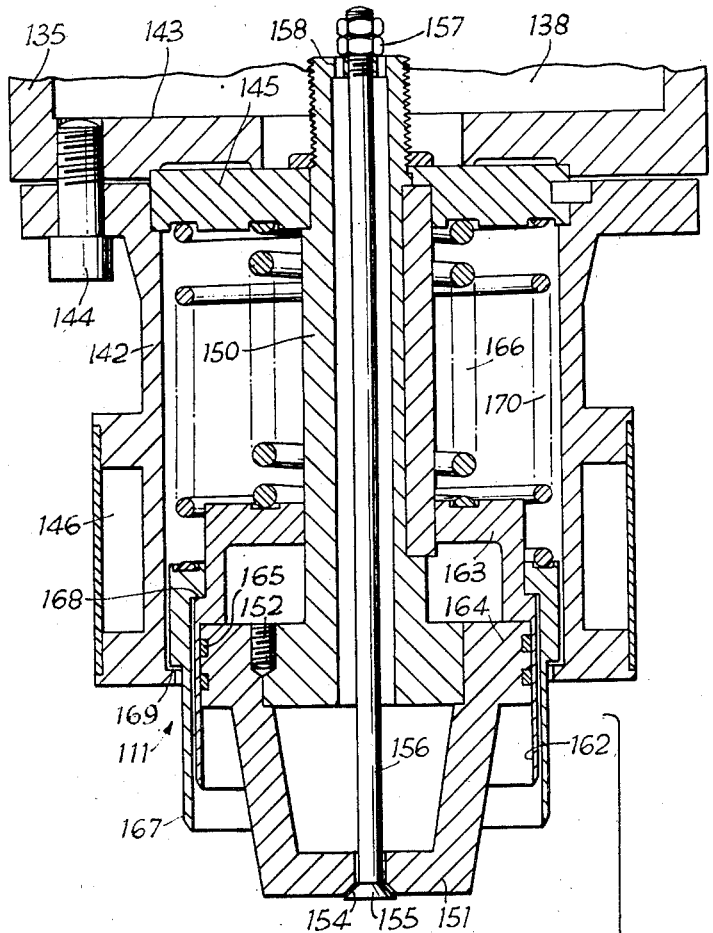
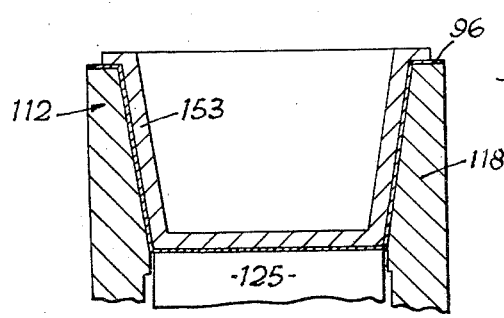

Jan. 1, 1963
K. KREISKY ETAL
3,071,087
DOUGH STAMPING MACHINE
Filed Sept. 9, 1959
15 Sheets-Sheet 14
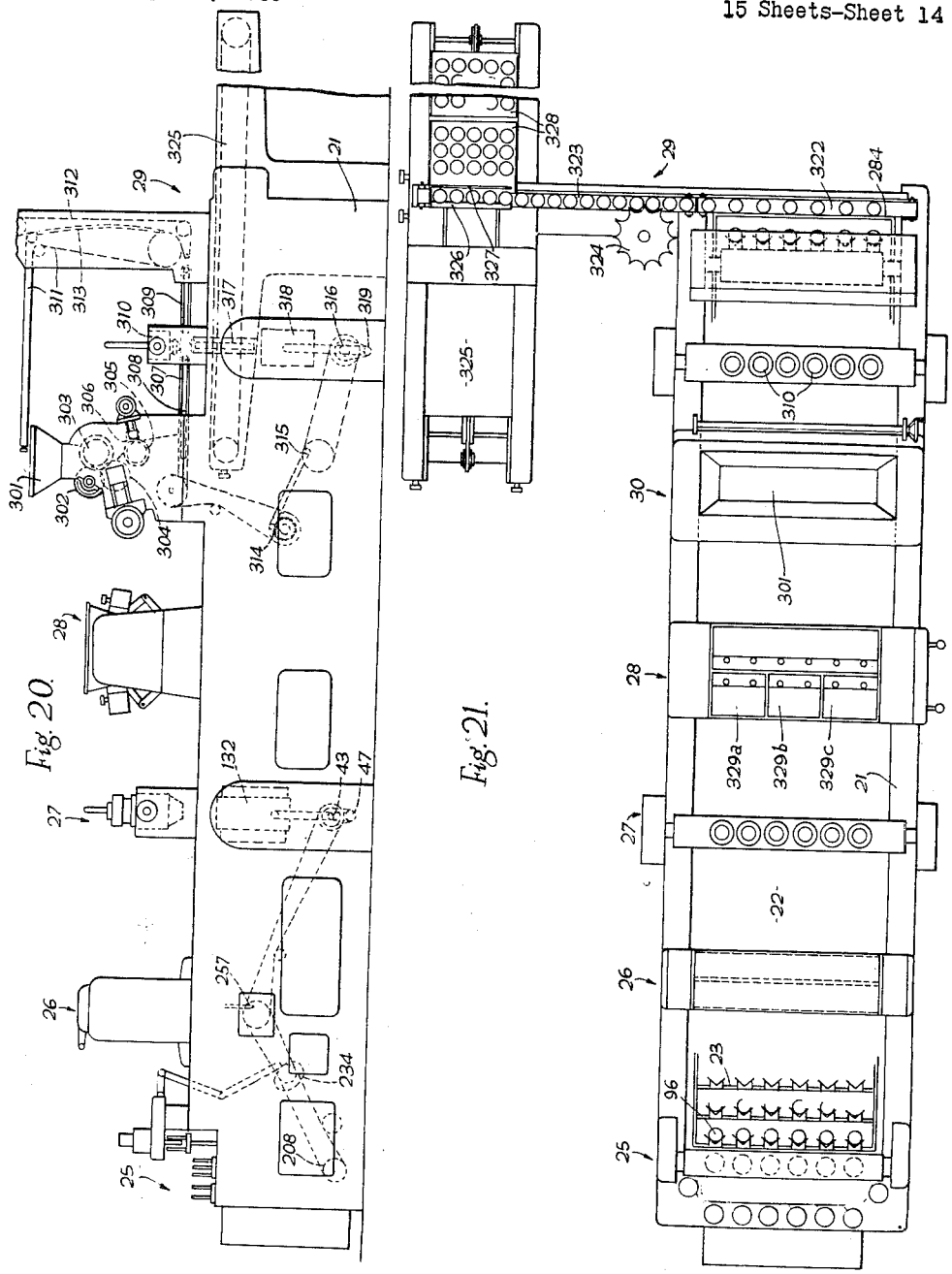

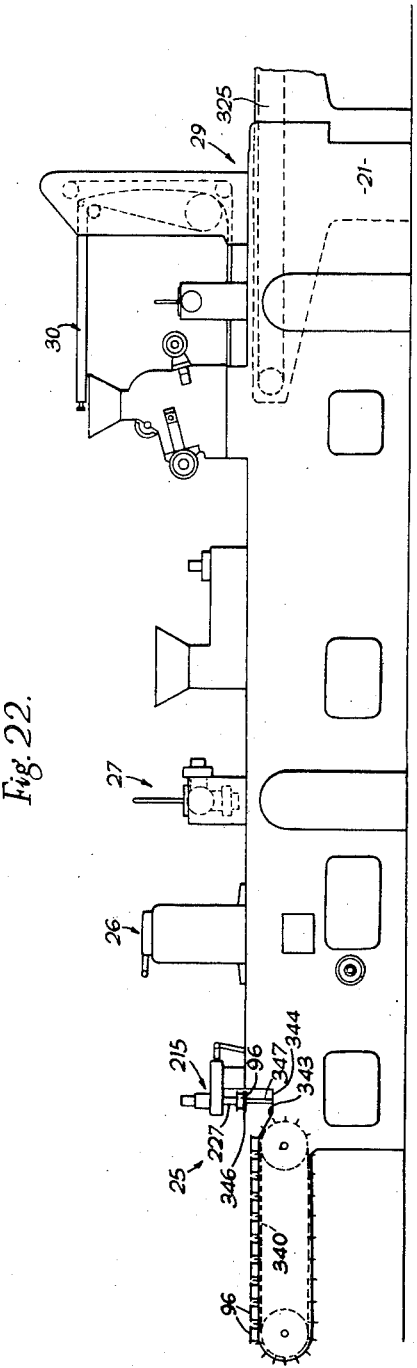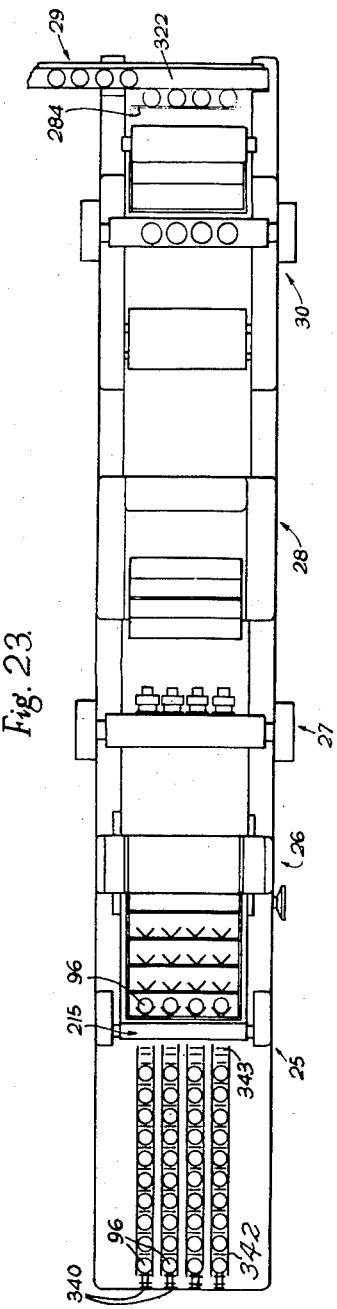

United States Patent Office 3,071,087
Patented Jan. 1, 1963

3,071,087
DOUGH STAMPING MACHINE
Kurt Kreisky and Ernst Georg Hurtz, London, England, and Heinz Frobeen, Brunsbuettelkoog, Germany, assignors to Atlas Equipment (London) Limited, London, England, a British company
Filed Sept. 9, 1959, Ser. No. 838,862
11 Claims. (Cl. 107—15)

The present invention relates to dough-stamping machines, and more particularly to dough stamping machines for use in the production of tarts, cup cakes, pies and the like in patty tins, foil cups etc. The machine is adapted to shape portions of dough or paste contained in the tins to form tarts or the like and deliver the tins containing the shaped dough at a so-called delivery station whence they can be removed for further processing. The machine according to the invention may be modified by the addition of automatic means for carrying out other stages in the production of tarts and the like so that the articles can be delivered at the delivery station in a condition ready for baking.

According to the present invention a dough-stamping and panning machine is provided comprising a table capable of intermittent, reciprocating, vertical motion, propelling means capable of reciprocating, horizontal motion so co-ordinated with the motion of the table that patty or pie tins, foil cups or the like and hereinafter referred to as tins for brevity can be moved by the propelling means intermittently along the table, and dough-stamping means situated and adapted to shape portions of dough or paste contained in the tins moved along the table by the propelling means.

The propelling means may comprise longitudinal, horizontal reciprocable members, such as rails, a horizontal frame or a series of interlinked horizontal frames, mounted along the length of the table and provided with a plurality of propelling members extending transversely across the surface of the table immediately above the highest position occupied by the table, and uniformly spaced from one another along the length of the table. Drive means operatively connected with the table and the reciprocable members provide the co-ordinated movements whereby, in operation, a patty tin placed on the table is intermittently and progressively moved along the table.

The propelling members may be adapted to move transverse rows of tins along the table. Thus, for example, four-, five-, or six-die machines may be constructed which are essentially similar but, by multiplication of the necessary apparatus, enable rows of four, five or six tins respectively to be handled.

Tins may be more positively located if in addition to the propelling members there are provided longitudinal, horizontal, second reciprocable members on which are mounted a plurality of holding members which also extend transversely across the table in alternation with the propelling members, being thus substantially coplanar with the propelling members. The movement of the holding members is coordinated with that of the propelling members whereby a tin is lightly gripped between propelling member and an adjacent holding member while in motion along the table, but is released from both on coming to rest by simultaneous movement of both members away from the tin. This more positive locating arrangement eliminates uncontrolled movements of the tins and permits a higher speed of operation of the machine.

Since the table has no movement in a horizontal direction, it may be provided with apertures through which may pass vertically moving members forming part of the dough-stamping means, and also vertically moving members of a dough dispenser and other apparatus which may be provided at points along the table. Such apparatus may include tin-dispensing means and/or a dough depositor which should be situated between the feed end of the table (that is, the end from which tins are moved along the table) and the dough-stamping means, and one or more of a filling depositor, a lidding device and delivery means successively situated between the stamping means and the discharge end of the table (the end towards which tins move). In order to simplify the operation of these various devices, it is desirable that the tins should remain at rest during each cycle of movement of the propelling means for a time sufficient for the various operations to be performed on stationary tins. It is thus preferable that the reciprocating movements of the propelling means should be intermittent, for example by arresting the movement immediately after the tins have been disengaged by the propelling members (and holding members when present).

The dough-stamping means may comprise an upper and a lower die assembly. The lower die assembly should be arranged to receive a tin as it is moved along the table by the propelling means and may be situated at an aperture in the table. The upper die assembly may move downwards to stamp dough or paste contained in a tin on the lower die assembly, or, where there is a suitable aperture in the table, the lower die assembly may be arranged to be raised through the aperture after the tin has been placed in position on it. In the later case the upper die assembly may be substantially stationary. It is preferred that the dough-stamping means should be provided with compensating means whereby portions of dough of slightly differing volumes may be accommodated without the escape or ejection of surplus dough on to the table or other parts of the machine.

Tin-dispensing means may be provided at the feed end of the table to place tins or rows of tins or the like automatically on the table. The tin-dispensing means may comprise a magazine for holding a number of patty tins or foil cups and transfer means for removing tins by suction singly from the magazine and placing them on the table. The transfer means may include a suction tube adapted to grip the top or bottom tin of a stack of tins in a magazine and place it on the table, the other tins being retained in the stack, for example by gravity or friction.

A dough dispenser may be provided between the tin-dispensing means and the dough-stamping means, and may comprise a container for a stock of dough or paste and means for dividing off portions of dough or paste of substantially constant volume and depositing them in tins suitably placed below the dispenser.

A filling depositor may be provided after the dough-stamping means, and may comprise a container for jam, paste, cake mixture, finely minced meat or other filling and metering means for depositing a predetermined quantity of filling in each of a number of tins containing moulded dough or paste as they are moved successively under the depositor. More than one depositor may be provided arranged successively along the table, so that, for example, a tart or cup cake may receive a primary filling which is subsequently covered by a main filling.

A lidding device may be provided to follow the filling depositor, and may comprise a container for dough or paste, means for producing a sheet of dough therefrom and conveying it immediately above a filled tin passing along the table, and a lid stamp adapted to stamp out a dough lid from the sheet on the top of a filled tin. The waste portions of the sheet may be conveyed back to the container. The lidding device may be immediately preceded by a damping device for moistening the upper surface of the rims of the tarts or pies.

At the so-called delivery station, mechanical delivery means may be provided, which may deliver the filled tarts or the like (contained in tins) on to a conveyor, which may be aligned with or at right angles to the table. Alternatively the filled tarts or the like in their tins may be delivered on to baking sheets carried by a conveyor.

A cross-conveyor may be used moving transversely past the end of the table where the last propelling member can push a tin or row of tins on to the cross-conveyor, and a reciprocating discharge member may push rows of tins from the cross-conveyor on to a baking sheet passing immediately below on a discharge conveyor parallel to the table. Alternatively, the discharge conveyor can deliver direct to a travelling oven.

Another form of delivery means comprises a plate in the plane of the table at its highest position, on to which a tin containing a tart or the like may be moved by one of the propelling members, coordinated drive means being provided to impart to the plate a sudden horizontal movement, whereby the tin having come to rest on the plate is allowed to fall on to a baking sheet passing beneath the plate. With this arrangement baking sheets with raised rims can be used. The movement of the baking sheet is preferably intermittent, so that the sheet may be stationary when a tart is dropped on to it.

One or more of the propelling members may be adapted to give a tin a small sideways displacement as well as movement along the length of the table. Thus, when the propelling members are adapted to move a row of tins, the spacing of the tins in the row may be varied. For example the tins may be widely spaced in the vicinity of the dough-stamping means, and more closely spaced at the delivery station so that they may be placed on a narrow baking sheet.

Figure 4:
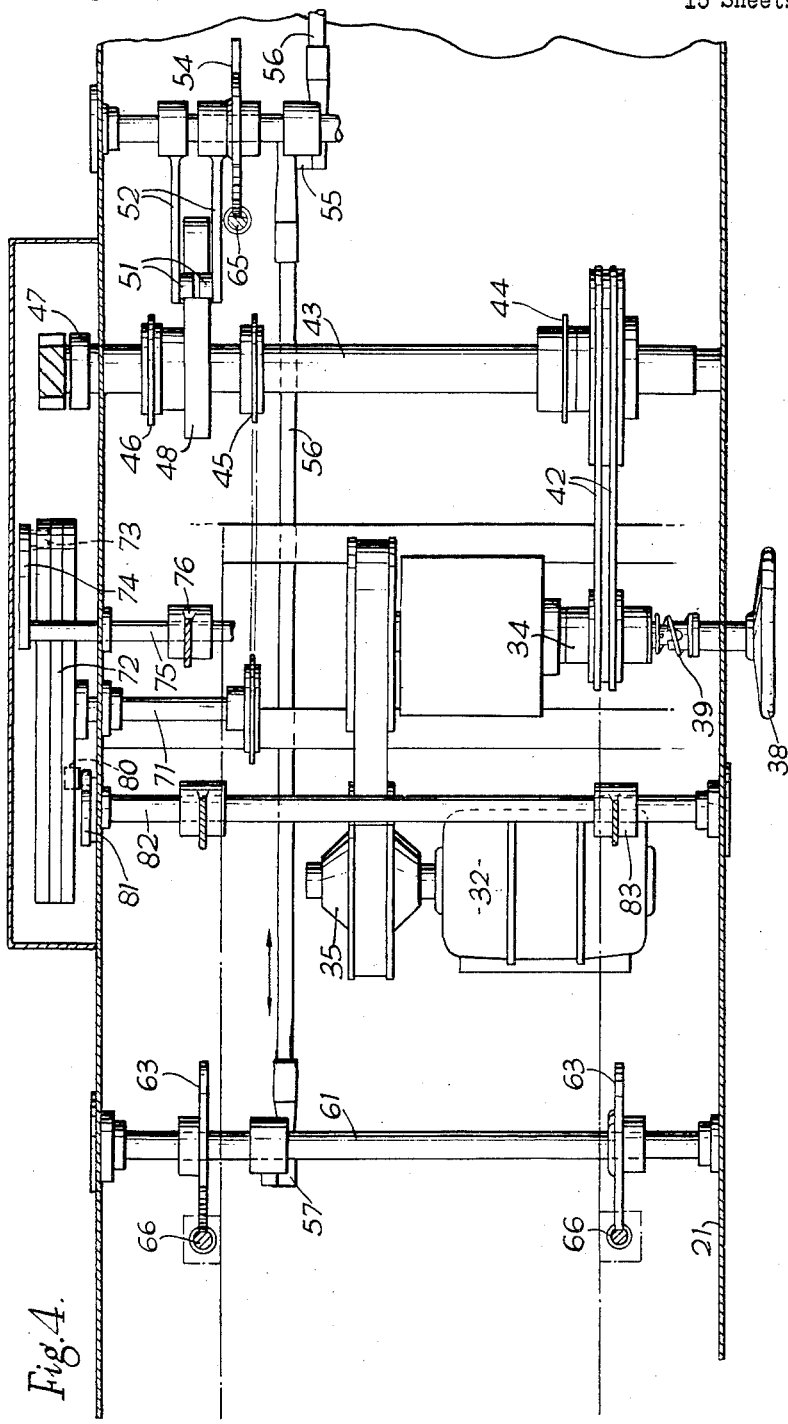
Figure 5:
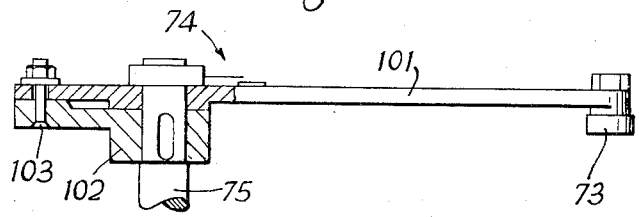
Figure 6:
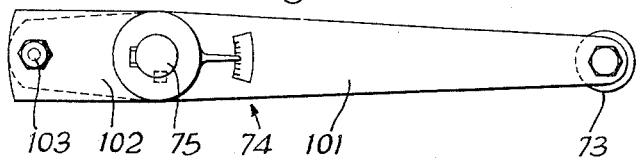
Figure 7:
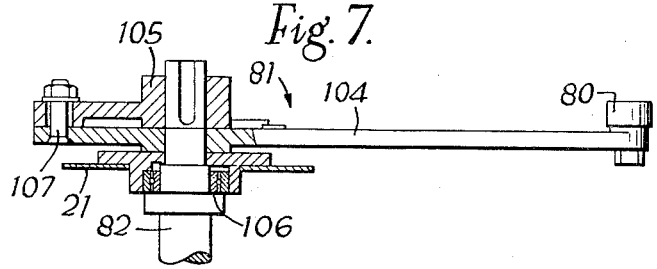
Figure 8:
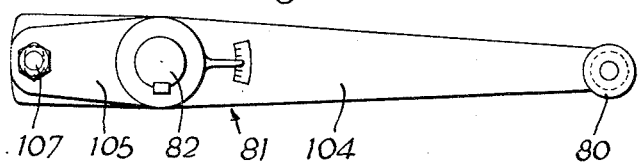
Figure 9:
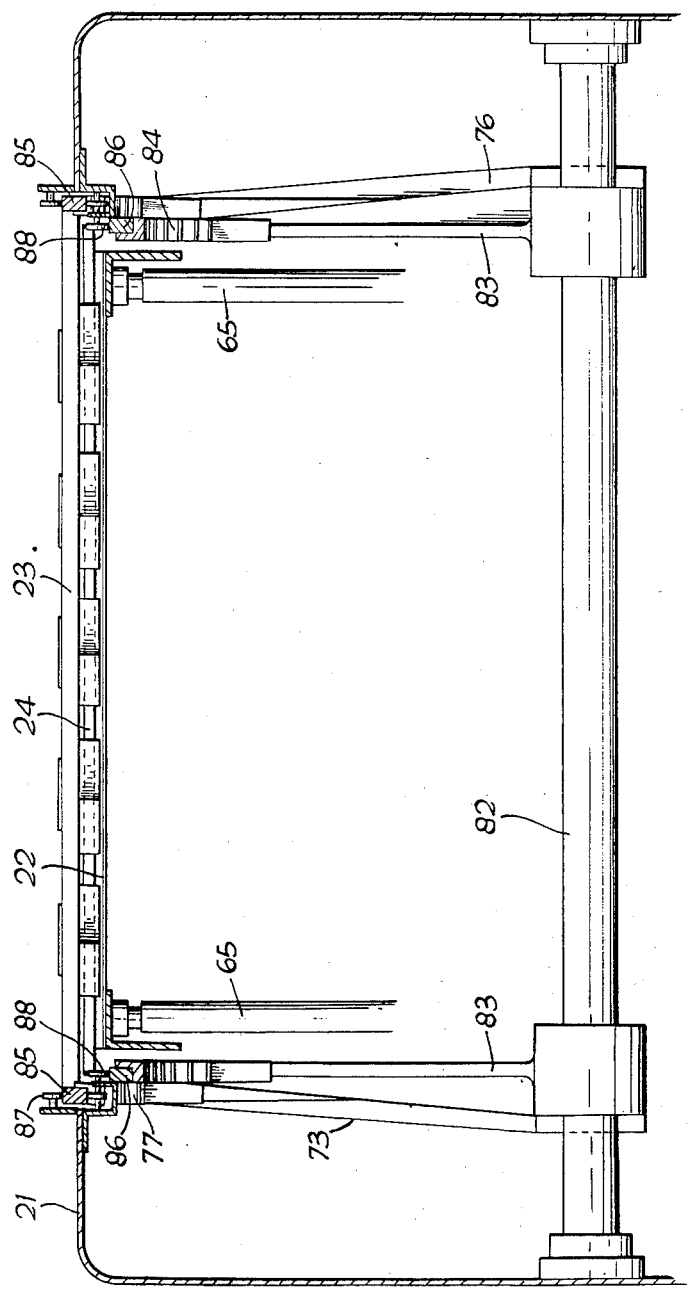
Figure 10:
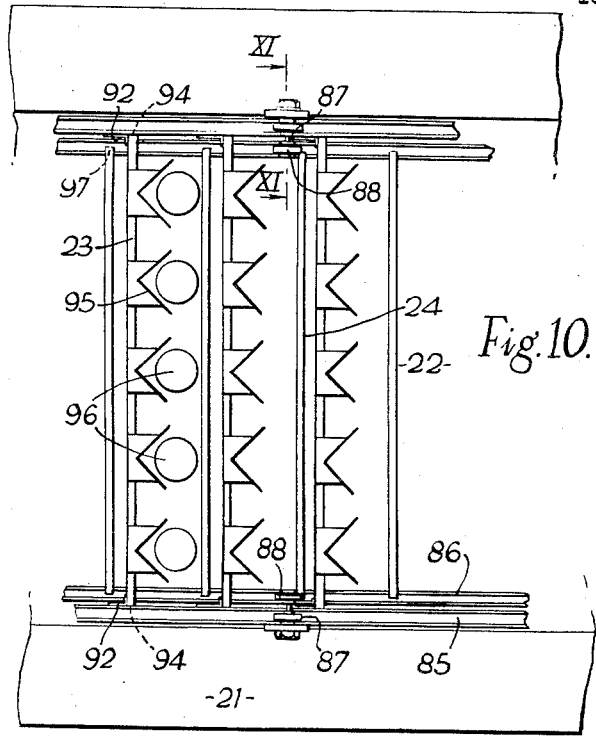
Figure 11:
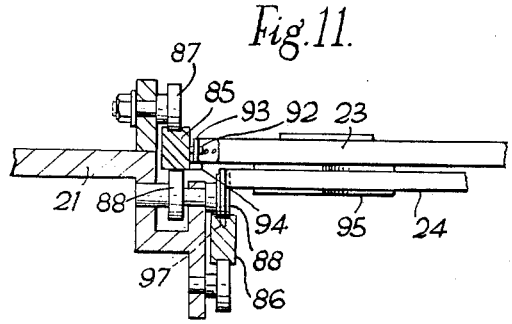
Figure 10A:
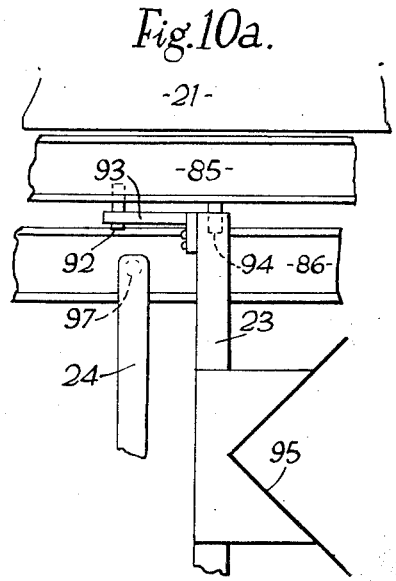
Figure 13:
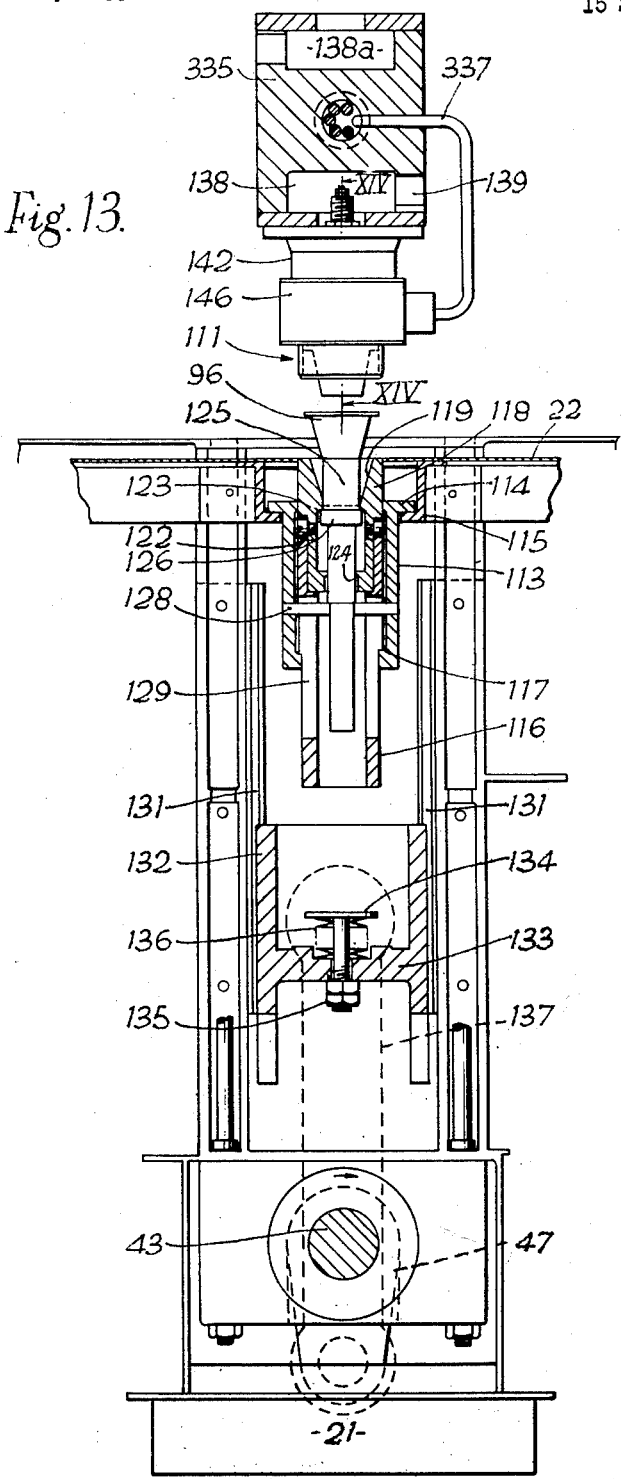
Figure 15:
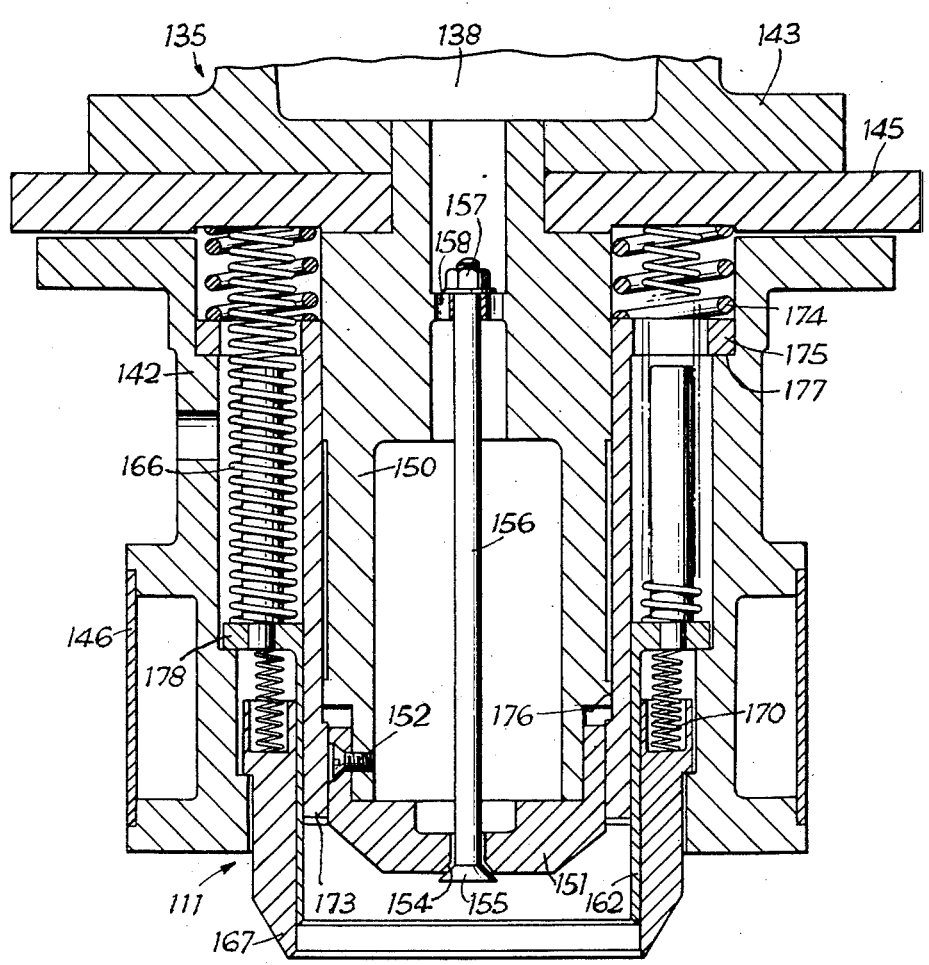
Figure 16:
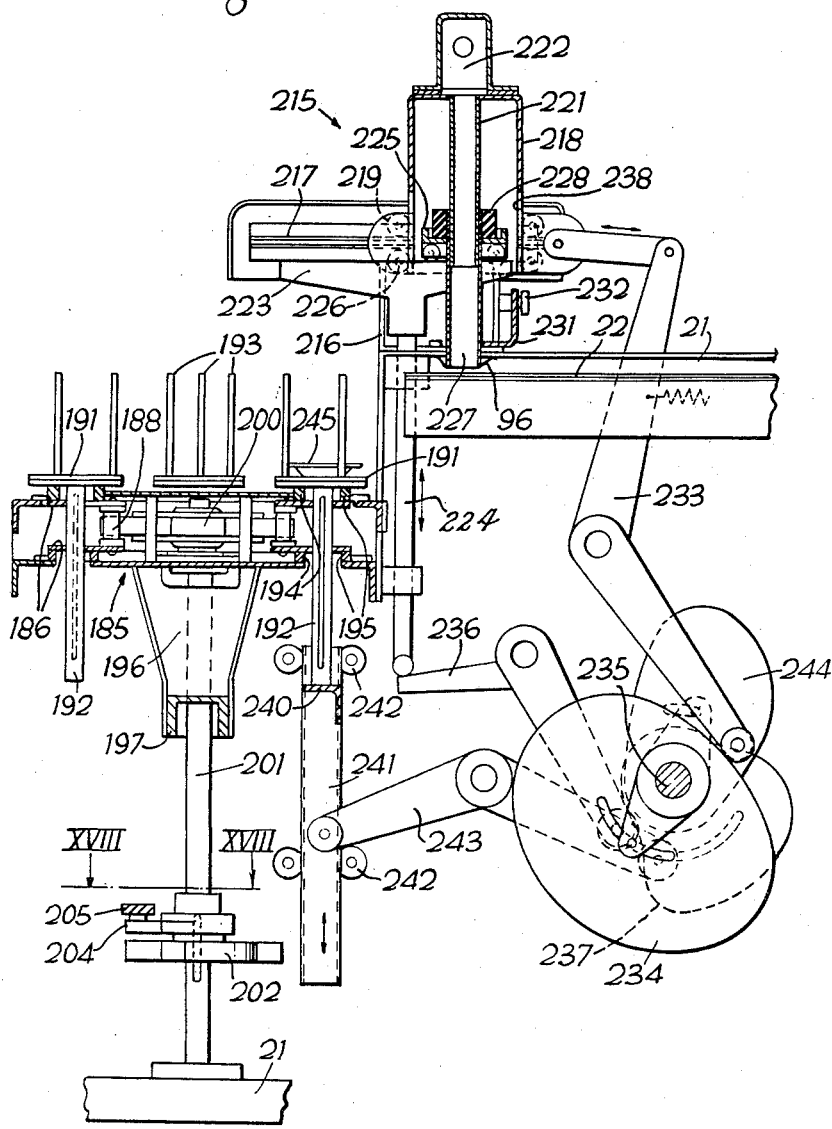
Figure 17:
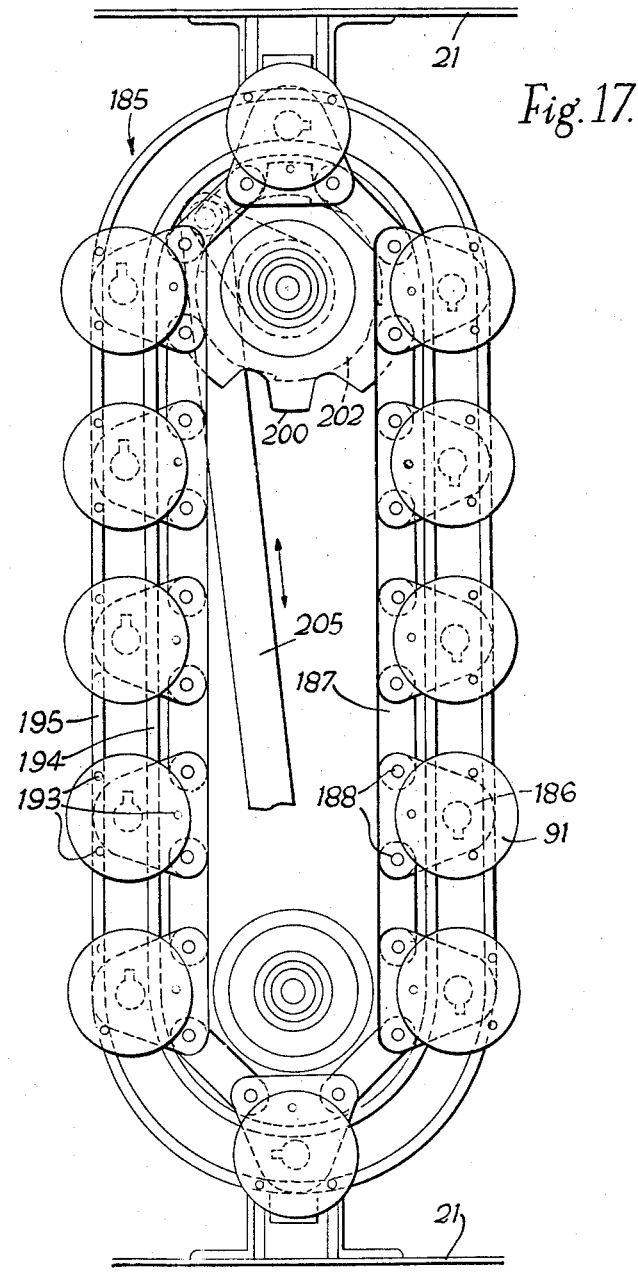
Figure 18:
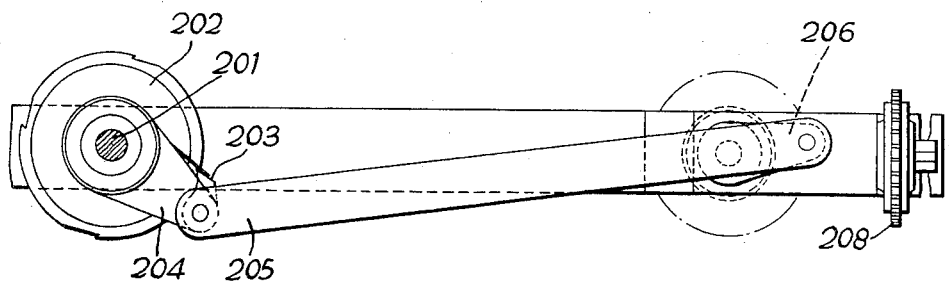
Figure 19:
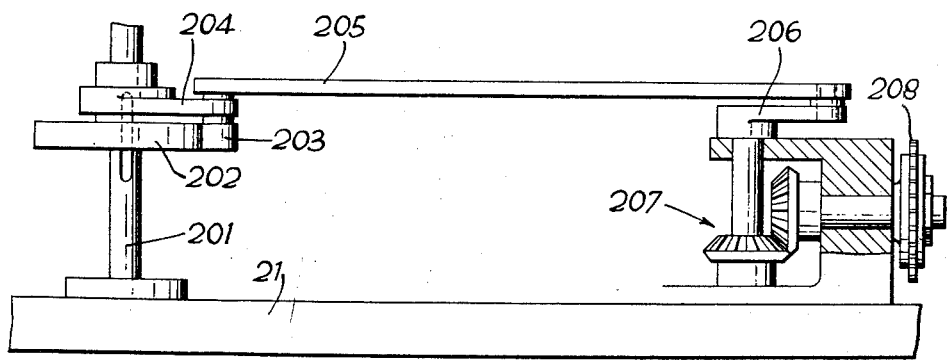

The invention will be further described by way of example with reference to the accompanying drawings, in which FIG. 1 is a side elevation of a five-die dough-stamping machine according to the invention, showing schematically various details, including the drive transmission system, FIG. 2 is a top plan view of the machine shown in FIG. 1, FIG. 3 is a side elevation, partly in section, of part of the interior of the machine shown in FIGS. 1 and 2, showing the main drive of the machine, FIG. 4 is a top plan view of the part of the machine shown in FIG. 3, FIGS. 5 and 6 are a top plan view partly in section and a side elevation respectively of a modified form of the first cam-actuated drop arm shown in FIGS. 3 and 4, FIGS. 7 and 8 are a top plan view partly in section and a side elevation respectively of a modified form of the second cam-actuated drop arm shown in FIGS. 3 and 4, FIG. 9 is a fragmentary vertical cross-section along the line 9—9 in FIG. 3, FIG. 10 is a top plan view of part of the machine shown in FIGS. 1–9, showing the mounting of the propelling and holding members, FIG. 10a is an enlarged showing of a detail of FIG. 10, FIG. 11 is a vertical cross-section along the line 11—11 in FIG. 10, FIG. 12 is a partly sectional and partly end elevational view of the dough-stamping means included in the machine shown in FIGS. 1 to 11, FIG. 13 is a vertical cross-section of one unit of the dough-stamping means taken along the line 13—13 in FIG. 12, FIG. 14 is a vertical cross-section of one form of upper die assembly taken along the line 14—14 in FIG. 13, FIG. 15 is a vertical cross-section, corresponding to FIG. 14, of an alternative form of upper die assembly, FIG. 16 is a longitudinal sectional view of the form of tin-dispensing means used in the machine shown in FIGS. 1 and 2, FIG. 17 is a top plan view of the magazine conveyor of the tin-dispensing means shown in FIG. 16, FIG. 18 is a horizontal section taken along the line 18—18 in FIG. 16, FIG. 19 is an end elevational view, partly in section, of the mechanism shown in FIG. 18, FIG. 20 is a side elevation of a second, six-die, machine according to the invention, showing schematically a lidding device and the drive therefor, and another form of delivery means, FIG. 21 is a top plan view of the machine shown in FIG. 20, FIG. 22 is a side elevation of a third, four-die, machine according to the invention, including modified tin-dispensing means, and FIG. 23 is a top plan view of the machine shown in FIG. 22.

Corresponding parts are indicated by the same reference numerals in all the figures in which they appear. Certain parts are omitted from some figures in the interests of clarity.

The five-die dough-stamping and panning machine shown in FIGS. 1 and 2 comprises a main frame 21 in which is mounted a vertically reciprocable table 22 and horizontally reciprocable propelling bars 23 and holding bars 24. Disposed successively along the table from the feed end are tin-dispensing means 25, a dough-dispenser 26, dough-stamping means 27, a filling depositor 28 and delivery means 29.

Referring now to FIGS. 1–11, and especially to FIGS. 3 and 4, an electric motor 32 is mounted transversely on the main frame 21 and drives the shaft 34 by means of a Simplabelt variable-speed belt drive including an expanding pulley 35, the motor being movable normal to its axis by means of the movable mounting 33 adjustable by the handwheel 36. The shaft 34 is provided with a handwheel 38 mounted on a dog-clutch to permit manual operation of the movements of the machine, the handwheel being normally disengaged from the shaft by a compression spring 39. The shaft 34 drives by means of a group of sprocket chains 42, a transverse shaft 43 which is journalled in the frame 21 and carries three further sprockets 44, 45 and 46, a crank 47 and a cam 48. A second crank may be provided at the other end of the shaft 43.

On the peripheral surface of the cam 48 rides a pair of followers 51 carried on arms 52 fixed to a rotatable shaft 53. Also fixed to the shaft 53 are two toothed sectors 54 (only one being shown in FIG. 4) and a drop arm 55. A track rod 56 connects the drop arm 55 to drop arms 57 and 58 fixed to rotatable transverse shafts 61 and 62 respectively, which carry pairs of toothed sectors 63 and 64 respectively. The pairs of sectors 54, 63 and 64 engage racks at the lower ends of three pairs of vertically slidable columns 65, 66 and 67 respectively. The six columns support the table 22, the intermittent vertical reciprocation of which is thus effected by the rotation of the cam 48.

The sprocket 45 drives a rotatable shaft 71 which carries, outside the main frame 21, a large cam disc 72. In either face of the cam disc 72 is a cam groove, each groove forming a closed curve on the face of the cam. In the cam groove on the outer face of the disc 72 rides a follower 73 carried by a first drop-arm 74 fixed to the end of a transverse rotatable shaft 75. Fixed to the shaft 75 is a pair of upwardly directed crank arms 76 each carrying at its upper extremity a toothed sector 77 (one arm is omitted from FIG. 4). A follower 80 in the cam groove on the inner face of the cam disc 72 actuates a second drop arm 81 on a transverse rotatable shaft 82 which carries a pair of crank arms 83 having at their upper extremities toothed sectors 84.

Along both sides of the machine, parallel to the long edges of the table, extend a pair of outer rails 85 and a pair of inner rails 86. The outer rails are supported between upper rollers 87 and intermediate rollers 88 and the inner rails between the intermediate rollers and lower rollers 89, shown also in FIGS. 9–11. Pairs of studs 92 uniformly spaced along the inner edges of the two outer rails pass through holes in spring leaves 93 fixed on the propelling bars 23 which are thus pivotable about the studs and are further supported at their forward end by blocks 94 (see especially FIG. 10a). This arrangement serves as a safety device to prevent serious injury to an operator's hand trapped between the table and the propelling bar, since the bar is free to swing upwards. Pairs of holes on the upper faces of the inner rails 86 receive the downward-turned ends 97 of the holding bars 24, which can thus also lift if an object is trapped beneath them. To each propelling bar is fixed five forks 95 which in operation move the tins 96 (only one row of which is shown in FIG. 10) along the table, and which are substantially coplanar with the holding members 24 and with them are situated immediately above the surface of the table 22 at the highest point of its reciprocating motion.

In the machine shown in FIGS. 1 and 2, the forks 95 are progressively more closely spaced on the propelling bars which come after the dough-stamping means 27, and the rows of five tins are therefore closed as they near the discharge end of the machine and can be delivered on to baking sheets of standard width.

The motion of the holding bars 24 must be so co-ordinated with the motion of the propelling bars 23 that a tin 96 on the table is lightly gripped between a pair of bars while being moved along the table. The motion of the bars is governed by the form of the cam grooves in the cam disc 72 (FIGS. 3 and 4), but if the machine is to be adaptable for use with tins or foil cups of different diameters it is necessary that the distance apart of corresponding propelling and holding bars in the gripping position should be adjustable. This can be done by using the alternative forms of cam-actuated drop-arms 74 and 81 as shown in FIGS. 5–8.

In the alternative form of drop-arm 74 (FIGS. 5 and 6) the cam follower 73 is carried by a long arm 101 which is rotatable about the shaft 75. A short arm 102 is keyed to the shaft 75 and the two arms are fastened together by a bolt 103 which passes through a hole of corresponding diameter in the short arm 102 and a slot in the long arm 101. It is thus possible to effect a limited adjustment of the relative position of the long arm 101 and the shaft 75. For ease of readjustment the relative position may be indicated by, for example, a pointer on the shaft 75 and a scale on the face of the arm 101. The drop-arm 81 correspondingly consists of a long arm 104 carrying the follower 80, a short arm 105 keyed to the shaft 82 (the shaft being journalled in the frame 21 by a bearing 106), and a bolt 107 passing through a hole in the long arm 104 and a slot in the short arm 105; it is similarly adjustable.

The operation of the main drive, table, propelling bars and holding bars is as follows. When the table 22 is in its high position, and a tin 96 is in position, lightly gripped between one of the forks 95 and the adjacent holding bar 24, rotation of the cam disc 72 causes the followers 73 and 80 to move simultaneously, rotating the shafts 75 and 82, and causing the racks 77 and 84 together to move in the forward direction, that is towards the discharge end of the table (left to right in FIGS. 1, 3 and 10). The racks cause the rails 85 and 86 together to move in the forward direction, carrying the propelling bars 23 and the holding bars 24. Meanwhile there has been no displacement of the cam followers 51, and so no movement of the table 22. The tin 96 thus remains gripped between the fork 95 and the holding bar 24 and is slid along the table 22 which is in its high position. When the tin has travelled a distance equal to the spacing of the propelling bars (or holding bars), the cam disc 72 causes the holding bars to continue forward for a predetermined short distance while the movement of the propelling bars is reversed. The bars thus move in opposite directions and both disengage the tin. The cams 48 and 72 are of such forms that there follows a short period of rest of the tin in its new position during which time operations may be performed on it. The cam 48, continuing its rotation, then permits rotation of the shaft 53 and thus of the sectors 54, and (through the track rod 56) of the sectors 63 and 64. The columns 65, 66 and 67 and the table 22 supported thereby move downward to their low position, in which position the tin on the table lies wholly below the lowest parts of the forks 95 and holding bar 24. The propelling bars continue or resume their backward movement and the holding bars begin a backward movement together with the propelling bars for a distance equal to the spacing of the propelling bars. When the propelling bars 23 have cleared the positions occupied by the tins 96, the table 22 is returned to its high position by further rotation of the cam 48, thus raising the tins between pairs of propelling and holding bars which are in their most separated condition. The propelling bars 23 are then again reversed by the cam disc 72 while the holding bars continue their backward movement. The pairs of bars thus converge on the tins and when the tins are lightly gripped the movement of the holding bars is reversed and the described cycle of operation is repeated. The tins are thus moved intermittently along the table from the feed end towards the discharge end.

At a point about midway along the table 22 is the dough-stamping means 27, shown in greater detail in FIGS. 12–15. This consists of five units mounted side by side across the machine each unit including an upper die assembly 111 and a lower die assembly 112. For the sake of clarity one unit only will be described in detail, the remaining units being identical except where a common drive is provided and in such other respects as will be mentioned.

The lower die assembly 112 comprises a cylinder 113 having an outwardly directed flange 114 at its upper end which is mounted on the member 115 forming part of the structure of the table 22. An intermediate sleeve 116 is slidably accommodated within the cylinder 113, and is supported at its lowest extreme of movement (relative to the table 22) by corresponding abutments 117 on the sleeve 116 and cylinder 113. The upper part of the sleeve 116 is of greater diameter, and receives and supports a generally cylindrical outer stamp 118, the upper portion of which has a surface 119 adapted to support the rim and side of a patty tin or foil cup 96. The outer stamp 118 is secured in the sleeve 116 by grub screws 122, but is easily replaceable, for example by a stamp of a different surface profile. It is provided internally with upper and lower abutments 123 and 124. When the sleeve 116 is supported by the abutments 117, the upper edge of the surface 119 of the outer stamp is in the plane of the table 22 and situated within a closely fitting aperture in the table. Within the outer stamp is a generally cylindrical inner stamp 125, the upper surface of which is adapted to support the base of the tin 96. The inner stamp 125 has a collar 126 which is movable between the abutments 123 and 124 (the outer press being split horizontally to permit the assembly of the inner and outer presses). The inner press is forked at its lower end by a slot 127, through which passes a pin 128 which is fixed in the cylinder 113 and passes through slots 129 in the sleeve 116. The inner press in its lowest position (relative to the table 22) is supported by the pin 128, and its upper surface is then coplanar with the upper edge of the surface 119 of the outer stamp and with the table 22.

Between vertical rails 131 fixed in the main frame 21 of the machine, an H-section block 132 is transversely mounted in the machine and slidable vertically. The cross-web 133 of the block is perforated and supports a platform 134 which is secured thereto by a pillar and nut 135 and is urged upwards by a strong compression spring 136. The block 132 is pivotally connected at its ends by two connecting rods 137 to cranks 47 mounted at the ends of the transverse shaft 43. There is considerable lost motion of the block 132 when it is out of contact with the sleeve 116.

A body 335 is mounted on side frames 336 to form a bridge across the table 22 above the lower die assembly 112. The body contains electrical leads 337 for heaters provided for the upper dies and an air chamber 138 to which air is supplied at a superatmospheric pressure by way of a duct 139. The air under pressure may be derived from the pressure side of an air compressor provided in the machine. To the underside of the body 335 is fixed (for each unit) a housing 142 carrying the upper die assembly 111. The housing 142 is secured to the base plate 143 of the body 335, for example by a screw 144, and is closed above by a backing plate 145. Its lower part is surrounded by an electrical heating coil 146, for example of 250 watts supplied by the leads 337.

The upper die assembly shown in FIG. 14 consists of a hollow central stamp 150 fixed in and extending through the backing plate 145 and provided with a detachable nose-piece 151, secured by screws 152, the lower surface of which is adapted to shape dough 153 contained in a tin or cup 96 of corresponding shape carried by the lower die assembly 112. In the centre of the lower surface is an aperture 154 provided with a conical seating, and a valve head 155 is carried by a stem 156 which is retained by a nut 157 outside the perforated upper end 158 of the hollow stamp 150. The nut is adjusted to permit a small displacement of the head 155 from its seating. The valve is thus in communication with the air chamber 138. The nose-piece 151 is surrounded by a sealing skirt 162, the lower edge of which is adapted to fit the top of the rim of the tin 96 to prevent the escape of dough therefrom. The skirt is a close sliding fit about the nosepiece and has an inwardly directed flange 163 at its upper end. It is retained by the abutment 164 on the nose-piece. Sealing rings 165 may be included to prevent seepage of paste between the nose-piece and the sealing skirt. A compression spring 166 is interposed between the flange 163 and the backing plate 145. The sealing skirt is itself closely surrounded by a stripper ring 167, the lower edge of which is adapted to fit the outer part of the rim of the tin 96 to assist in removing it from the upper die after a stamping operation. There are corresponding abutments 168 and 169 on the stripper ring and on the sealing skirt 162 and housing 142 respectively, and a compression spring 170 is interposed between the upper end of the stripper ring 167 and the backing plate 145.

The alternative form of upper die assembly shown in FIG. 15 comprises a hollow central stamp 150 mounted in a backing plate 145 and provided with a nose-piece 151 secured by screws 152, an aperture 154, a valve head 155 on a stem 156 retained by a nut 157 outside a perforated wall 158. The nose-piece 151 is adapted to shape only the sides and base of a tart or the like, the top of the rim being shaped by the lower edge of a rim sleeve 173 which is interposed between the central stamp 150 and the sealing skirt 162. Strong compression springs 174 are interposed between an outwardly directed flange 175 on the sleeve and the backing plate 145. Abutments 176 and 177 for the sleeve are provided on the central stamp and housing respectively. The sealing skirt 162 has an outwardly directed flange 178 between which and the backing plate are compression springs 166. The stripper ring 167 is supported by an abutment 169 on the housing, and compression springs 170 are interposed between it and the flange 178 of the sealing skirt. An upper die assembly of the form described with reference to FIG. 15 is suitable for use with a lower die which is not resiliently yieldable. Thus it may be used with a lower die assembly of the form described with reference to FIG. 13, but with the modification that the platform 134 should be fixed on the block 132, for example by replacing the compression spring 136 by a distance piece or an assembly of shims of corresponding height or by making the platform 134 integral with the cross-web 133.

In operation, during a period of lost motion of the block 132 a tin 96 is moved along the table 22 until it comes to rest on the upper surface of the inner stamp 125. As the propelling bars 23 and holding bars 24 disengage the tin and move away for a predetermined short distance, the crank 47 continuing its rotation causes the platform 134 to raise the sleeve 116, and with it the outer stamp 118 from its low position to the intermediate position where the lower abutment 124 reaches the collar 126. At this point the upper surfaces of the inner and outer stamps support the entire under surface of tin 96, and thereafter, by continued rotation of the crank 47, the inner and outer presses are raised together towards the upper die assembly 111. The rim of the tin 96 first reaches the stripper ring 167 (or stripper pins, if present), which is raised against the spring or springs 170, and then the sealing skirt 162, which is raised against the spring or springs 166. The upward motion of the lower die continues towards top dead centre of the crank 47 and dough is shaped (as at 153) to occupy the space between the lower die and the nose-piece 151 and sealing skirt 162 (and the rim sleeve 173 in FIG. 15). Small variations in the volume of dough 153 are accommodated by the yielding of the lower die against the spring 136 (in FIG. 13) or of the rim sleeve 173 against the spring 174 (in FIG. 15). The valve head 155 is pressed upwards by the dough 153, thereby cutting off the emission of compressed air from the aperture 154.

The crank 47 now passes top dead centre and the lower die assembly 112 begins to descend. The pressure on the head 155 relaxes and under the influence of the emitted compressed air, and helped by the stripper ring 167, the tin 96 and shaped dough are released from the heated upper die. The downward movement continues until the upper end of the slot 127 in the inner press 125 reaches the pin 128, whereupon the inner press comes to rest in the plane of the table 22 (which has remained in its high position). As the block 132 continues its descent the sleeve 116 (and thus the outer stamp 118) comes to rest on the abutment 117.

During the period of lost motion, as the crank 47 moves towards and past bottom dead centre, the table 22 is lowered to its low position, carrying with it the lower die assembly 112 and the tin 96 supported thereby, whereafter the propelling members 23 move back one place, passing above the tin, and the table returns to its high position where the next succeeding forward movement of the propelling members moves the tin 96 away along the table and replaces it on the inner stamp 125 by the corresponding tin in the following row.

The dough-stamping means may be modified to include two sets of upper die assemblies carried on the body 335, the body being mounted capstan-fashion in the side members 336 and provided wtih duplicated air chambers (as at 138a in FIGS. 12 and 13, for dies at 180° spacing). Such an arrangement facilitates cleaning and inspection of the working surfaces of the upper dies and also permits a rapid change from one form of die to another, for example when changing over from the production of tarts to that of cup cakes. The form of the lower die assembly shown in FIGS. 12 and 13 can be readily exchanged by raising the inner and outer presses 118 and 125 until the grub screws 122 can be withdrawn. The inner press and the upper portion of the outer press can then be lifted out.

It is possible to modify the dough-stamping means by using a movable upper die assembly 111 and a substantially stationary lower assembly 112. Thus, for example, the transverse body 335 can be mounted for vertical movement in the side frames 336 and long connecting rods provided to connect the body 335 to second cranks mounted on the ends of the shaft 43, spaced at 180° from the cranks 47. The lower die assembly should then be modified so that raising of the block 133 causes only the outer press 118 to rise to an extent sufficient to provide support for the tin 96 (equivalent to the intermediate position), the inner press 116 being immovable relative to the table 22. Alternatively, the inner press can be lowered and the outer be stationary relative to the table.

The tin-dispensing means 25 indicated in FIGS. 1 and 2 is shown in greater detail in FIGS. 16-19. A magazine conveyor 185 consists of twelve pairs of triangular plates 186 linked in an endless chain by links 187 and pins 188. Each pair of plates is vertically spaced and provided with corresponding central apertures. Each pair carries a base 191, and a shaft 192 secured to the underside of the base passes slidably through the apertures and is splined to prevent rotation. On each base three upright rods 193 serve to locate a stack of patty tins, foil cups or the like placed on the base, and the conveyor is so arranged that at any time five stacks of tins are spaced across the machine beyond the end of the table 22. The pair of plates is slidable between inner and outer pairs of vertically spaced rails 194 and 195 respectively, and the upper rail of each pair also serves to support the bases 191. The inner pairs of rails 194 are mounted on a bracket 196 carried by a cross-member 197 mounted in the main frame 21 below the level of the conveyor 185. The outer rails 195 are mounted directly on a portion of the frame. The conveyor is intermittently rotated by a star wheel 200 which engages the pins 188 and is mounted on a shaft 201 journalled in the bracket 196 and the base of the frame 21 and provided with a ratchet wheel 202. As is more clearly shown in FIGS. 18 and 19, the ratchet wheel is actuated by a sprung pawl 203 carried by an arm 204 rotatably mounted about the shaft 201, the end of the arm being connected by a connecting rod 205 to a crank 206 which is driven through bevel gears 207 by a sprocket 208. The sprocket 208 is driven by way of sprocket chains 211, 212 and 213 from the sprocket 46 on the shaft 43 (see FIGS. 1 and 3).

The transfer means 215 used to transfer tins from the magazine conveyor 185 to the table 22 is mounted across the end of the table on frame side-members 216. Rails 217 are fixed at each side of the table, and on them is reciprocably mounted a transverse hollow body 218, open below, extending across the table, and having rollers 219 running on the rails 217. The body has five internal, downwardly directed suction tubes 221 opening in five apertures in the top of the body and spaced across the table to correspond to the desired location of the first row of tins on the table. A suction chamber 222 is carried on top of the body and is in constant communication with the tubes 221, and through a flexible connection with suction apparatus—conveniently the intake side of the compressor used to supply the valve in the upper die assembly 111.

Platforms 223 at opposite sides of the table are supported by shafts 224 and carry a transverse trolley 225 having wheels 226 running on the tops of the platforms. The trolley 225 is located within the lower part of the body 218 and has five openings through which pass the lower ends of the suction tubes 221. Sliding tubes 227 fit closely but slidably round the lower end of the suction tubes 221 and pass through the openings in the trolley 225, being retained by heavy rubber rings 228 mounted about their upper ends. In their lowest position, the lower ends of the sliding tubes 227 are immediately above the surface of the table 22. Stripper forks 231 embrace the lower ends of the sliding tubes 227, and the five forks may be formed together as a single slotted member. The forks or slotted member is secured to the fixed frame by nuts 232 on threaded studs passing through slots in the forks. These slots permit the adjustment of the height of the forks relative to the table and allow for the use of patty tins or foil cups of various heights.

The transverse body 218 is given a reciprocating motion by a spring-biased bell crank 233 actuated by a cam 234 fixed to the shaft 235 which is driven by way of sprocket chains 212 and 213 from the shaft 43. The body can move between positions in which the tubes 227 are (as in FIG. 1) directly above the nearest row of five stacks on the conveyor 185 and (as in FIG. 16) directly above the table 22 in advance of the first of the propelling bars 23 (not shown in FIG. 16). The platforms 223 carried by the shafts 224 can be raised by bell cranks 236 actuated by a cam 237 also fixed to the shaft 235, slots 238 being provided in the walls of the body 218 to permit this movement. A bar 240 extends across the machine below the five stacks of tins at the end of the table and is carried between two vertical members 241 running between rollers 242. The members 241 and hence the bar 240 can be raised and lowered by a bell crank 243 actuated by a cam 244 also fixed to the shaft 235. For the purpose of adjustment, the angular position of each of the cams 234, 237 and 243 relative to the shaft 235 is adjustable by means of short crank arms carrying securing bolts working in slots in the cams.

In operation, when the magazine conveyor 185 is stationary, during the reverse movement of the pawl 203 on the ratchet wheel 202, the body 218 is in its position where the tubes 227 are directly above the nearer row of five bases 191 and the stacks of tins 245 carried by them (as in FIG. 1). Continuing rotation of the shaft 235 then causes the cam-actuated bell crank 243 to raise the bar 240 against the stems 192 of the five bases 191 until the stacks of tins are raised against the lower ends of the tubes 227 (as in FIG. 1). The tubes 227 may be displaced upwards along the suction tubes 221 by distances varying with the height of the stacks of tins 245 on the bases 191. The bar 240 and bases 191 are then lowered together with the stacks of tins 245, the uppermost tins 96 being retained by suction on the end of the tubes 227. The bell crank 233 then moves the body 218 (and the trolley 225 within it) to the position shown in FIG. 16, and thereafter the bell crank 236 raises the platforms 223 and thus the trolley 225 and tubes 227. The tins 96 are thereupon stripped from the bottom of the tubes 227 by the embracing forks 231 and fall on to the surface of the table 22 in its high position immediately in front of the first propelling bar 23 (not shown in FIG. 1). Meanwhile, the bar 240 having returned to its lower position, forward motion of the pawl 203, due to continuing rotation of the crank 206, causes the shaft 201 to execute a quarter-turn, and the conveyor 185 moves round one place. When the propelling bar and table carry out the cycle movements which moves the new row of tins 96 along the table, the platforms 223 are lowered again and the body 218 (and trolley 225 within it) moved back to its FIG. 1 position for the cycle of movements to be repeated. The intermittent circulation of the bases 191 enables the stacks of tins 245 to be replenished as necessary without stopping the machine.

The dough-dispenser 26 (as indicated in FIG. 1) consists of a hopper 250, the bottom of which is closed by transverse fluted rollers 251 and 252, below which is a second pair of rollers 253 and 254. Dough drawn from the hopper is extruded intermittently through five orifices 255 in the form of cylinders, predetermined lengths of which are cut off by pairs of knives 256. The drive for the rollers is accommodated in the side casings 249, the roller 254 being driven by a crank 257 rotated by the sprocket chain 213 from the sprocket 44 on the shaft 43, the crank actuating a slotted arm 258 which rotates the roller 254 by a ratchet wheel and pawl. The effective length of the arm 258 is adjustable by virtue of the slot in which the connection with the crank is made. The roller 253 is geared to the roller 254, the roller 252 is driven from a crank on the axle of the roller 253 by means of a slotted arm and ratchet and pawl, forming an intermediate adjustment and the roller 251 is geared to the roller 252. The volume of dough dispensed per cycle can therefore be adjusted by varying the angular displacement of the lower rollers 253 and 254 for each cycle of the machine, the throw of the crank being constant. The knives 256 are mounted on bell cranks 259 which are actuated by a cam 260 mounted on the same shaft as the crank 257.

The double filling depositor 28 indicated in FIG. 1 comprises two hoppers 265 from which fillings such as jam, meat paste or macaroon paste can be metered by two rows of five cylinders 266 and pistons 267 through two rows of five nozzles 268 to pass into two successive rows of tins beneath. The pistons are actuated by adjustable bell cranks 269 having followers riding in cam grooves in the disc 270 driven by sprocket chains 271, 272 and 273 from the sprocket wheel 46 on the shaft 43. The cam drive is accommodated within the side casing 274.

The delivery means 29 at the delivery station of the machine shown in FIG. 1 comprises a transverse plate 280 mounted across the machine for horizontal movement in the frame 21, and movable by a bell-crank 281 acted upon by a tension spring 279 under the control of a cam 282 driven by sprocket chains 283 and 273 from the shaft 43. In its normal position close to the end of the table 22 the plate 280 can receive the last row of tins when pushed from the table by the last propelling bar 284. The cam 282 then causes the plate to execute a sudden horizontal movement, and the row of tins falls on to a baking sheet passing below on a conveyor 285. Tins sticking to the plate are cleared by a bar 292 fixed in the frame and passing closely over the surface of the plate 280. Baking sheets may be placed on the conveyor through openings 286 in the side of the machine, and as it is preferable that the sheet should be stationary when the tins fall on it, the conveyor is intermittently driven by a sprocket chain 287, a crank 288, and a connecting rod 289 operating a pawl and ratchet wheel 290 geared to the end roller 291 of the conveyor 285.

The embodiment of the invention shown in FIGS. 20 and 21 is a six-die machine provided with tin-dispensing means 25, dough-dispenser 26, dough-stamping means 27 and twin filling-depositor 28 similar to those in the embodiment described with reference to FIGS. 1–19. The first hopper 329 of the filling depositor 28 is divided into three (a, b and c) so that three pairs of two tins each may be filled simultaneously with three respective different fillings. These are followed by a lidding device 30 which consists of a hopper 301 for containing dough paste, the lower end of which is closed by a transverse fluted roller 302 and a pair of plain rollers, one 303 having end flanges and the other 304 running between the flanges. A second pair of equalising rollers 305 and 306, one flanged, receives the sheet of dough extruded by the pair 303 and 304 and converts it into an even sheet. The thickness of the sheet can be varied by adjusting the positions of the rollers 304 and 306. The sheet of dough is fed on to a conveyor 307 which consists of seven spaced parallel tapes passing over end rollers, the spaces between the tapes being wider than the top of the pies to be lidded. Between the tapes run two longitudinally spaced idle endless bands 308 and 309, of width equal to that of the conveyor 307 and running over end rollers. These support the dough between the tapes except in the vicinity of the lidding stamps. Six lidding stamps 310 are mounted above the space between the idle bands 308 and 309. Each lidding stamp is basically similar to the upper die 111 of the dough-stamping means 27 as in FIG. 14, the protuberant nose-piece being replaced by one suited to the conformation of the upper surface of a lidded pie, and the sleeves 162 and 167 being replaced by a single sleeve the lower edge of which is adapted to cut a lid from the sheet of dough by pressure on the rim of the tin. From the conveyor 307 the dough sheet is raised between conveyors 311 and 312, braced by a convex backing plate 313 and thence returned by the conveyor 311 to the hopper 301. The conveyor 307 is driven intermittently by a pawl-actuated ratchet wheel 314 driven by a crank 315 which is connected by a sprocket drive with a shaft 316 driven by sprocket chains (not shown) from the main drive of the machine. Directly below the lidding stamps are six apertures in the table 22 through which can be raised lower dies 317 similar to the lower dies 112 of FIGS. 12 and 13, and thus adapted to support the whole undersurface of the tin. The dies 317 are actuated by a block 318 (similar to the block 132) and driven by a crank 319 (cf. 47) on the shaft 316.

In operation, tins containing shaped dough and filling pass under a rim-moistening device, for example a damped roller of foam plastic or like cellular material, and come to rest over the apertures in the table, the table being in its high position. The lower dies 317 are raised through the apertures and carry the tins against the lidding stamp, the sheet of dough passing between the conveyors 307 and 308 being temporarily at rest and nipped between the tins and the lidding stamps. Portions (usually circular) of the sheet of dough are detached by the skirts of the stamps pressing on the rims of the tins and adhere to the moistened rims of the pies. The inner dies 317 are then lowered, whereafter the table and propelling bars complete their cycle of movement and the tins are moved away.

The delivery means 29 shown in FIGS. 20 and 21 include a relatively fast cross-conveyor 322 onto which the last propelling bar 284 pushes a row of tins, and a relatively slow cross-conveyor 323 receiving the tins from the faster conveyor 322, the tins thus becoming more closely spaced. The spacing of tins on the conveyor 323 is made even by the synchronously rotating star-wheel 324. The conveyor 323 passes closely over the surface of a delivery conveyor 325 moving parallel to the table 22 of the machine. Rows of tins are pushed from the cross-conveyor 323 on to the conveyor 325, by means of the reciprocating bar 326 and guard bar 327, which may pass directly into a continuous oven, or on to baking sheets 328 carried by the conveyor 325 (as shown in FIG. 21). By this means rows of five tins may be placed on standard-width baking sheets after filling in rows of six on the six-die machine.

The four-die machine shown in FIGS. 22 and 23 includes a dough-dispenser 26 and a dough-stamping means 27 as in the machine shown in FIG. 1, a filling depositor of different form indicated generally at 28, and a lidding device 30 and delivery means 29 as shown in FIGS. 20 and 21.

The tin-dispensing means 25 shown in FIGS. 22 and 23 are intended for use with tins which are vertically sided or otherwise unstackable and so cannot be dispensed by the arrangement shown in FIGS. 16–19.

The dispensing means consists of a series of four parallel chain conveyors 340, provided with dogs for maintaining tins at a predetermined spacing, on which tins 96 may be placed by hand, and which convey the tins towards the table between pairs of stationary guides 342. The conveyor delivers the tins on a sloping table 343 down which they slide to a well 344. The floor of the well 344 is provided with apertures in which are situated bases 346 mounted on the heads of columns 347. The columns can be raised, for example by the arrangement of bell-crank 243 and cam 244 on the shaft 235 as shown in FIG. 16. Tins 96 sliding into the well 344 come to rest on the bases 346 which are then raised by the columns 347. The tins are then transferred to the table 22 by transfer means 215 of the same form as that shown in FIG. 16, the tins being pressed against the bottom of tubes 227 (as shown in FIG. 22) and then moved over the table and stripped by the forks 231 when the platforms 223 are raised (see FIG. 16).

We claim:

1. A dough-stamping machine comprising a table having a surface and a feed and delivery end, propelling means extending over the surface of said table for forwardly moving along the table a tin resting thereon, drive means operatively connected with said propelling means to impart thereto a reciprocating, horizontal motion and operatively connected with said table to effect cyclically a vertically downward movement of said table after the horizontal movement of said propelling means in the forward direction and a subsequent vertically upwards movement of said table after the horizontal movement of said propelling means in the reverse direction whereby said tin is intermittently moved forward along the table, and dough-stamping means comprising a lower die shaped to receive and support said tin, an upper die shaped to mould dough contained in said tin and actuating means operatively connected to said drive means to cyclically effect relative movement between said upper and lower dies to bring the same into dough-moulding cooperation with a tin received and supported by said lower die after traversal of said table by said tin, under the action of the propelling means, said actuating means subsequently bringing said dies out of cooperation before further movement of said tin by said propelling members.

2. A dough-stamping machine according to claim 1, wherein the dough-stamping means comprises a lower die assembly disposed generally below the table and having an upper surface shaped to receive and support a tin, an upper die assembly, and means for accommodating without the rejection of surplus dough small variations in the volume of portions of dough to be stamped, the lower die assembly being movable vertically through an aperture provided in the table between a lower position in which a tin moved along the table can be received by the lower die assembly and an upper portion in which dough contained in a tin supported by the lower die assembly is shaped by pressure against a portion of the lower surface of the upper die assembly shaped therefor.

3. A dough-stamping machine according to claim 2, wherein the dough-stamping means includes means for causing an emission of air at a superatmospheric pressure from an aperture provided in the said portion of the lower surface of the upper die assembly.

4. A dough-stamping machine according to claim 2, wherein sealing means are provided in the upper die assembly for preventing the escape of dough over the rim of a tin and a resiliently yieldable mounting is provided for one of the upper and lower die assemblies.

5. A dough-stamping machine according to claim 2, wherein the lower die assembly comprises a cylindrical inner press having an upper surface which is shaped to support the base of said tin, and a coaxial cylindrical outer press having an upper surface which is shaped to support the sides and rim of the tin, the outer press being movable between a low position in which the upper edge of its upper surface is coplanar with the upper surface of the inner press and with the table in its highest position and an intermediate position in which the upper surfaces of both presses cooperate to form a surface corresponding to the underside of a tin and both presses being movable together between the intermediate position and a common high position in which the shaping of dough can occur, means being provided coordinating the motion of the lower die assembly with that of the table and the propelling means so that said tin can be moved along the table until its base rests on the inner press and thereafter an upward and return vertical movement of the lower die assembly occurs between successive movements of the propelling means.

6. A dough-stamping machine according to claim 1, wherein tin-dispensing means are provided at the feed end of the table, the tin-dispensing means comprising a magazine adapted for holding a plurality of tins and transfer means adapted to grip one of said tins by suction, remove it from the magazine and place it on the table, the remaining tins being retained in the magazine.

7. A dough-stamping machine according to claim 6, comprising a transverse feed conveyor, a plurality of magazines adapted for holding stacks of tins on said transverse feed conveyor for successive intermittent movement past the said feed end of the table, and the transfer means comprises a carriage reciprocably mounted over the feed end of the table, a suction tube dependent from said carriage and having an open lower end which is normally at a level immediately above that of the table in its high position and an upper end, suction apparatus connected to said upper end, lifting means for raising a magazine above the level of the feed conveyor and drive means adapted to move the carriage horizontally, longitudinally of the table between a first position in which the suction tube can receive the top tin of a stack held by one of said magazines raised by the lifting means and a second position in which the suction tube is over the table beyond the propelling means, and to raise the carriage whereby the said top tin can be stripped from the tube by a fixed horizontal fork which embraces the lower end of the suction tube in the said second position.

8. A dough-stamping machine according to claim 1, comprising delivery means including a conveyor extending longitudinally of the table immediately under the delivery end of the table and in the same direction as movement of said tin along the table, a discharge plate reciprocably mounted in the plane of the table in its highest position and immediately beyond the delivery end of the table for receiving a tin discharged from the table by the propelling means, and coordinated drive means for imparting to the plate a sudden horizontal movement whereby a tin resting on the plate is caused to fall onto the conveyor below.

9. A dough-stamping machine according to claim 1, wherein the propelling means extends transversely of the table and is adapted to move transverse rows of a plurality of tins along the table, and a plurality of dough-stamping means extending transversely of the table to effect dough stamping of dough in a plurality of tins simultaneously.

10. A dough-stamping machine according to claim 1, wherein said propelling means comprises horizontal, longitudinally reciprocable member extending in the direction of motion of the tin and a plurality of uniformly spaced propelling members mounted on the reciprocable members and extending transversely across the table above the surface thereof.

11. A dough stamping machine according to claim 10 including second horizontal, longitudinally reciprocable members extending parallel to the first-named reciprocable members and a plurality of uniformly spaced holding members mounted on said second members and extending transversely over the surface of said table in alternation with and substantially coplanar with said drive means to effect cyclically, firstly, a relative movement of said holding members towards the respective adjacent propelling members after said upward movement of said table whereby said tin is gripped between propelling members and respective adjacent holding members while said tin is moved forwardly along the table, and, secondly, a subsequent relative movement of said holding members away from said propelling members before said downward movement of the table whereby said tin is released before the descent of the table.

References Cited in the file of this patent

UNITED STATES PATENTS

| 259,542 | Holmes | June 13, 1882 |
| 786,816 | Hutchison | Apr. 11, 1905 |
| 835,756 | Hutchison | Nov. 13, 1906 |
| 1,274,606 | Salerno | Aug. 6, 1918 |
| 2,625,892 | Elvis | Jan. 20, 1953 |

FOREIGN PATENTS

| 7,086 | Great Britain | June 25, 1906 |
| 385,035 | Great Britain | Dec. 22, 1932 |